(12) United States Patent
Lai (10) Patent No.: US 11,309,812 B1
(45) Date of Patent: Apr. 19, 2022

(54) MOTOR SYSTEM (71) Applicant: Global Mixed-mode Technology Inc., Hsin-Chu (TW)

(72) Inventor: Ching-Feng Lai, Taipei (TW)

(73) Assignee: Global Mixed-mode Technology Inc., Hsin-Chu (TW)

( * ) Notice: Subject to any disclaimer, the term of this patent is extended or adjusted under 35 U.S.C. 154(b) by 9 days.

(21) Appl. No.: 17/033,960

(22) Filed: Sep. 28, 2020

(51) Int. Cl.
*H02P 6/15* (2016.01)
*H02P 6/18* (2016.01)

(52) U.S. Cl.
CPC ............ *H02P 6/153* (2016.02); *H02P 6/187* (2013.01)

(58) Field of Classification Search
CPC .......... H02H 9/041; H02H 9/042; H02H 3/20; H02H 9/044; H02H 7/08; H02H 7/127; H03K 17/0822; H03K 5/24; H03K 17/08122; H03K 17/6871; G01R 19/16538; H02P 1/12; H02P 1/42; H02P 6/12
See application file for complete search history.

(56) References Cited

U.S. PATENT DOCUMENTS

| | | | | |
|---|---|---|---|---|
| 5,796,194 A * | 8/1998 | Archer | .................... | H02K 29/12 310/184 |
| 7,486,041 B2 * | 2/2009 | Wasson | .................. | G04C 3/143 318/432 |
| 7,554,279 B2 * | 6/2009 | Loffler | ...................... | H02P 6/34 318/400.01 |
| 9,329,023 B2 | 5/2016 | Kunida | | |
| 10,224,843 B2 | 3/2019 | Hano | | |
| 2019/0109548 A1 * | 4/2019 | Raute | ...................... | H02P 1/423 |

FOREIGN PATENT DOCUMENTS

| | | | | |
|---|---|---|---|---|
| CN | 1862945 A | 11/2006 | | |
| CN | 102437804 A | 5/2012 | | |
| DE | 69818136 T2 * | 6/2004 | ............... | H02P 6/26 |
| TW | 200627783 | 8/2006 | | |
| TW | 201720046 A | 6/2017 | | |

* cited by examiner

*Primary Examiner* — Said Bouziane
(74) *Attorney, Agent, or Firm* — Winston Hsu (57) ABSTRACT

The present invention discloses a motor system without a hall sensing element. The motor system comprises a first output pin, a second output pin, an auxiliary pin, a stator, a rotor, a primary coil, and an auxiliary coil. Both the primary coil and the auxiliary coil surround the stator. The primary coil is coupled to the first output pin and the second output pin. The auxiliary coil is coupled to the auxiliary pin. The auxiliary coil is configured to determine a phase switching time point. The motor system detects the zero point of the voltage of the auxiliary pin, so as to detect the position of the rotor and determine the phase switching time point.

17 Claims, 7 Drawing Sheets

MOTOR SYSTEM

BACKGROUND OF THE INVENTION

1. Field of the Invention

The present invention relates to a motor system, and more particularly, to a motor system without a Hall sensing element.

2. Description of the Prior Art

Figure 1:
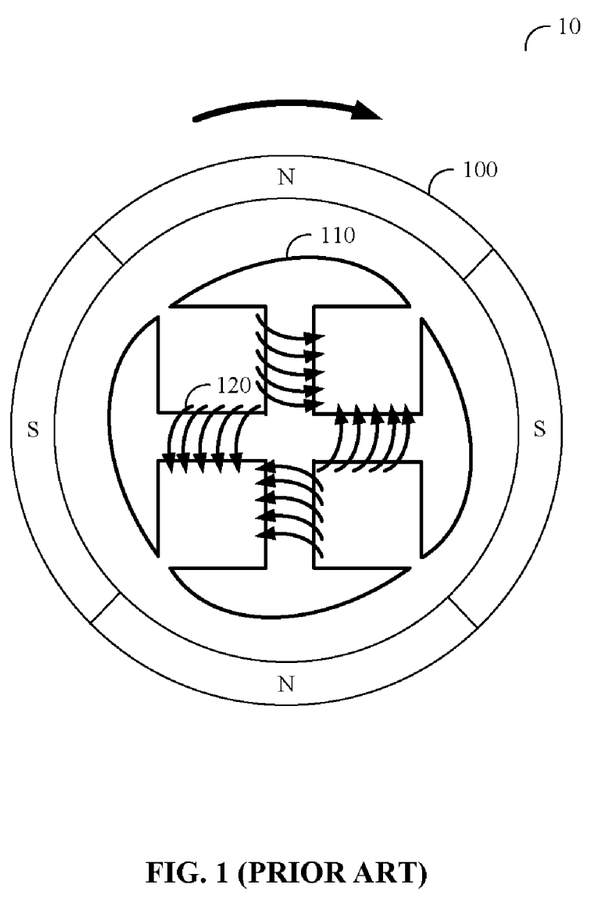
FIG. 1 is a schematic diagram showing a conventional motor module.
Figure 2:
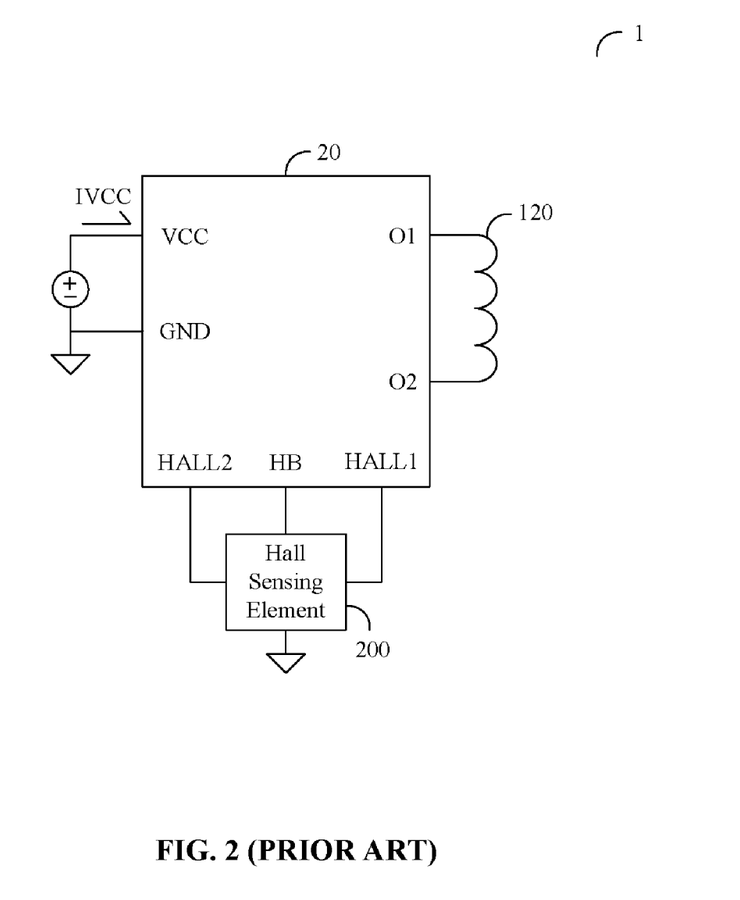
FIG. 2 is a schematic diagram showing a conventional motor system.
Figure 3:
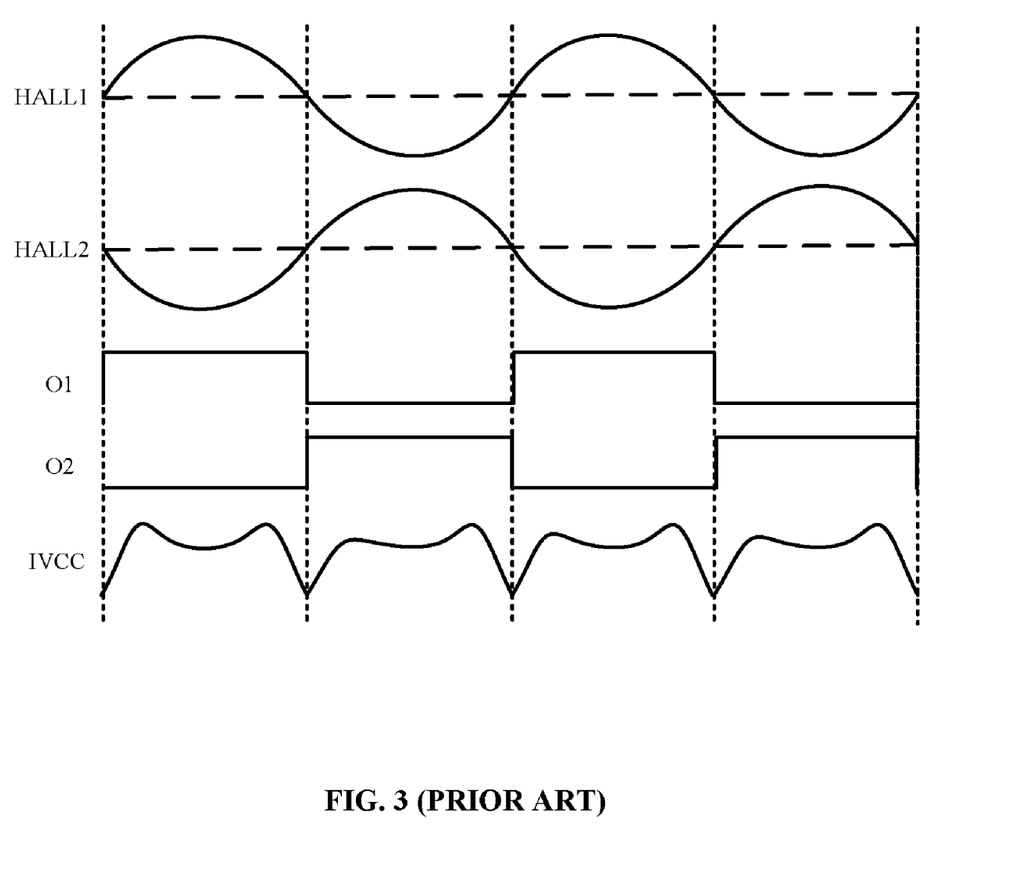
FIG. 3 is a timing chart showing the related signals of FIG. 2.

FIG. 1 is a schematic diagram showing a conventional motor module 10. The motor module 10 comprises a rotor 100, a stator 110, and a winding 120. The rotor 100 may be divided into two magnetic poles N and two magnetic poles S to switch phases. The winding 120 may surround the stator 110 for driving the rotor 100 based on the magnetic induction resulting in the variation of the magnetic field. FIG. 2 is a schematic diagram showing a conventional motor system 1. Please refer to FIG. 1 and FIG. 2 simultaneously. The motor system 1 comprises a motor controller 20 and a Hall sensing element 200. The motor controller 20 provides a fixed voltage to the Hall sensing element 200 via the terminal HB. The Hall sensing element 200 may be placed nearby the winding 120 for sensing the variation of the magnetic field due to the rotation of the rotor 100, so as to detect the position of the rotor 100 and respectively generate a first sensing signal and a second sensing signal to the terminal HALL1 and the terminal HALL2 for the motor controller 20 to switch phases. FIG. 3 is a timing chart showing the related signals of FIG. 2. Based on the first sensing signal and the second sensing signal, the motor controller 20 enables the first terminal O1 and the second terminal O2 to generate alternative signals for driving the motor module 10. However, the sensing error due to the Hall sensing element 200 may degrade the performance of the motor module 10. Besides, the installation of the Hall sensing element 200 results in an increase of the volume and the cost of the motor system 1, such that it is disadvantageous to integrate the motor system 1 into the electronic apparatus.

Thus, it has become an important issue to replace the Hall sensing element for reducing the volume and the cost of the motor system.

SUMMARY OF THE INVENTION

According to embodiments of the present invention, a motor system without a Hall sensing element is provided. The motor system comprises a motor module and a motor controller. The motor module comprises a rotor, a stator, and a winding. The rotor may be divided into two magnetic poles N and two magnetic poles S to switch phases. The winding may surround the stator for driving the rotor based on the magnetic induction resulting in the variation of the magnetic field. The winding comprises a primary coil and an auxiliary coil, where the auxiliary coil is configured to determine a phase switching time point for replacing a Hall sensing element. The motor controller comprises a first terminal, a second terminal, a first auxiliary terminal, a second auxiliary terminal, a terminal VCC, and a terminal GND. The primary coil is coupled to the first terminal and the second terminal while the auxiliary coil is coupled to the first auxiliary terminal and the second auxiliary terminal. The motor system may determine the phase switching time point based on the voltage of the first auxiliary terminal.

The motor controller further comprises a switch circuit, a control unit, a current detecting unit, and a voltage detecting unit. The switch circuit includes a first transistor, a second transistor, a third transistor, and a fourth transistor. The switch circuit is configured to supply a driving current to the primary coil. The first transistor is coupled to the terminal VCC and the first terminal while the second transistor is coupled to the first terminal and the terminal GND. The third transistor is coupled to the terminal VCC and the second terminal while the fourth transistor is coupled to the second terminal and the terminal GND. The first transistor, the second transistor, the third transistor, and the fourth transistor may be respectively a p-type MOSFET or an n-type MOSFET. The current detecting unit is coupled to the first terminal and the second terminal, so as to generate a first detecting signal to the control unit for detecting the zero point of the driving current. The voltage detecting unit is coupled to the first auxiliary terminal, so as to generate a second detecting signal to the control unit for detecting the zero point of the voltage of the first auxiliary terminal. The control unit generates a plurality of control signals to control the switch circuit.

When the voltage of the first terminal is changed from a high level to a low level, the driving current will decrease gradually. When the driving current decreases to 0, the voltage of the first auxiliary terminal will increase from 0 to an intermediate value and then decrease to 0 again. The last zero point of the voltage of the first auxiliary terminal may be regarded as a phase switching time point. Thus, when the zero point of the driving current is detected by the current detecting unit, the first detecting signal is changed from the low level to the high level, so as to inform the control unit to start to detect the zero point of the voltage of the first auxiliary terminal. When the zero point of the voltage of the first auxiliary terminal is detected by the voltage detecting unit, the second detecting signal is changed from the low level to the high level, so as to inform the control unit that the current time point is the phase switching time point. Moreover, when the motor module is operated under a start state or a normal operation state, it is capable of utilizing the auxiliary coil and the voltage of the first auxiliary terminal for determining the phase switching time point.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The above-mentioned and other objects, features, and advantages of the present invention will become apparent with reference to the following descriptions and accompanying drawings, wherein.

DETAILED DESCRIPTION

Preferred embodiments according to the present invention will be described in detail with reference to the drawings.

Figure 4:
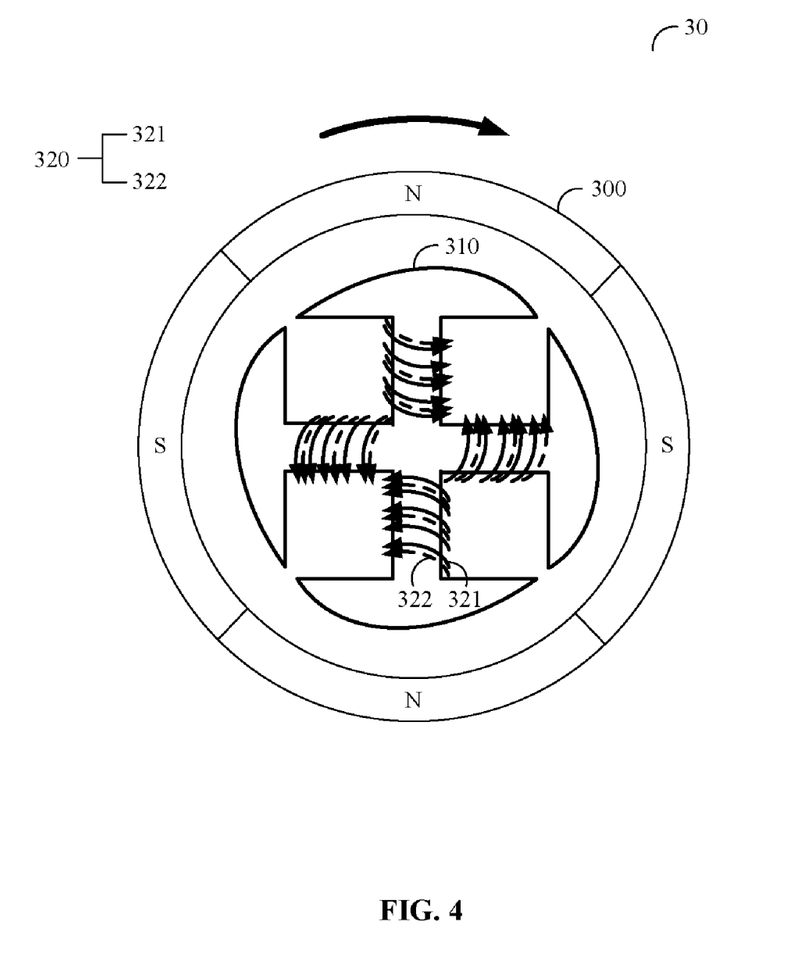
FIG. 4 is a schematic diagram showing a motor module according to one embodiment of the present invention.
Figure 5:
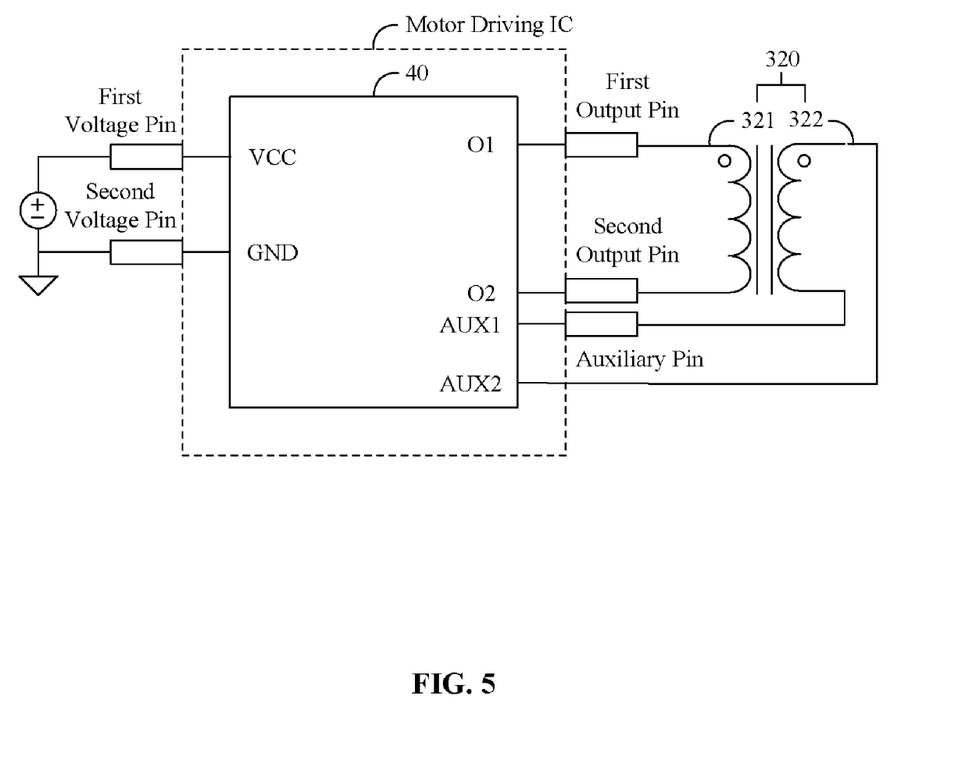
FIG. 5 is a schematic diagram showing a motor controller and a winding according to one embodiment of the present invention.

FIG. 4 is a schematic diagram showing a motor module 30 according to one embodiment of the present invention. The motor module 30 comprises a rotor 300, a stator 310, and a winding 320. The rotor 300 may be divided into two magnetic poles N and two magnetic poles S to switch phases. The winding 320 may surround the stator 310 for driving the rotor 300 based on the magnetic induction resulting in the variation of the magnetic field. The winding 320 comprises a primary coil 321 and an auxiliary coil 322, where the auxiliary coil 322 is configured to determine a phase switching time point for replacing a Hall sensing element. The primary coil 321 has a first turn number N1 and the auxiliary coil 322 has a second turn number N2, where $N1/N2$ is greater than 1 or equal to 1. FIG. 5 is a schematic diagram showing a motor controller 40 and the winding 320 according to one embodiment of the present invention. The motor controller 40 comprises a first terminal O1, a second terminal O2, a first auxiliary terminal AUX1, a second auxiliary terminal AUX2, a terminal VCC, and a terminal GND. The terminal VCC and the terminal GND are coupled to a voltage source. The primary coil 321 is coupled to the first terminal O1 and the second terminal O2 while the auxiliary coil 322 is coupled to the first auxiliary terminal AUX1 and the second auxiliary terminal AUX2. The second auxiliary terminal AUX2 may be coupled to the first terminal O1, the second terminal O2, or a reference voltage. Thus, the auxiliary coil 322 may be coupled to the first terminal O1, the second terminal O2, or the reference voltage. Moreover, according to one embodiment of the present invention, the motor controller 40 may be packaged to be a motor driving IC (Integrated Circuit). The motor driving IC may comprise a first output pin, a second output pin, an auxiliary pin, a first voltage pin, and a second voltage pin. The first output pin is coupled to the first terminal O1. The second output pin is coupled to the second terminal O2. The auxiliary pin is coupled to the first auxiliary terminal AUX1. The first voltage pin is coupled to the terminal VCC. The second voltage pin is coupled to the terminal GND. A terminal of the auxiliary coil 322 may be coupled to the first output pin, the second output pin, or the reference voltage.

Figure 6:
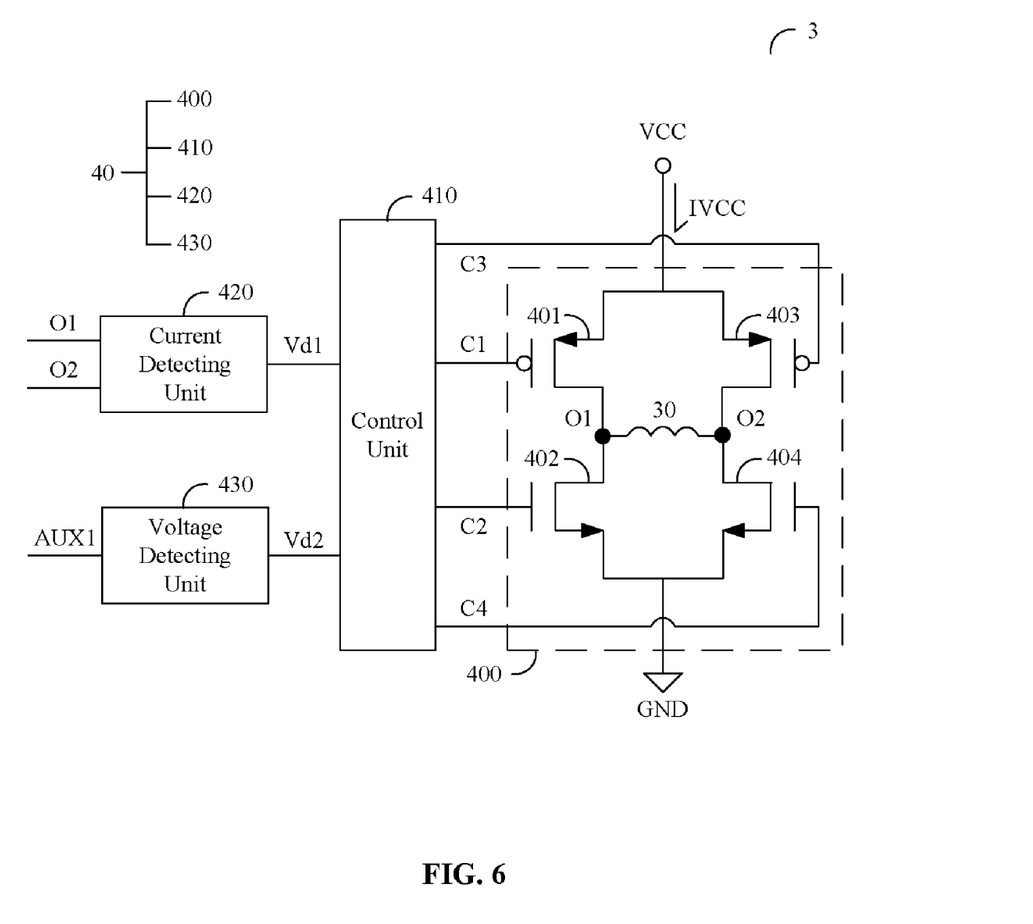
FIG. 6 is a schematic diagram showing a motor system according to one embodiment of the present invention.

FIG. 6 is a schematic diagram showing a motor system 3 according to one embodiment of the present invention. The motor system 3 comprises the motor module 30 and the motor controller 40. The motor controller 40 further comprises a switch circuit 400, a control unit 410, a current detecting unit 420, and a voltage detecting unit 430. The switch circuit 400 is coupled to the terminal VCC and the terminal VCC generates a supply current IVCC to the switch circuit 400. The switch circuit 400 is configured to supply a driving current to the primary coil 321, where the driving current may be analogous to the supply current IVCC. The switch circuit 400 includes a first transistor 401, a second transistor 402, a third transistor 403, and a fourth transistor 404. The first transistor 401 is coupled to the terminal VCC and the first terminal O1 while the second transistor 402 is coupled to the first terminal O1 and the terminal GND. The third transistor 403 is coupled to the terminal VCC and the second terminal O2 while the fourth transistor 404 is coupled to the second terminal O2 and the terminal GND. The first transistor 401, the second transistor 402, the third transistor 403, and the fourth transistor 404 may be respectively a p-type MOSFET or an n-type MOSFET. As shown in FIG. 6, each of the first transistor 401 and the third transistor 403 may be a p-type MOSFET, while each of the second transistor 402 and the fourth transistor 404 may be an n-type MOSFET. The current detecting unit 420 is coupled to the first terminal O1 and the second terminal O2, so as to generate a first detecting signal Vd1 to the control unit 410 for detecting the zero point of the driving current. The voltage detecting unit 430 is coupled to the first auxiliary terminal AUX1, so as to generate a second detecting signal Vd2 to the control unit 410 for detecting the zero point of the voltage of the first auxiliary terminal AUX1. The motor system 3 may determine the phase switching time point based on the voltage of the first auxiliary terminal AUX1.

The control unit 410 generates a first control signal C1, a second control signal C2, a third control signal C3, and a fourth control signal C4 for respectively controlling the ON/OFF states of the first transistor 401, the second transistor 402, the third transistor 403, and the fourth transistor 404. The control unit 410 operates alternatively in a first driving mode and a second driving mode, so as to supply the electric energy to the motor module 30. In the first driving mode, the control unit 410 turns on the first transistor 401 and the fourth transistor 404 by controlling the first control signal C1 and the fourth control signal C4. At this moment the current flows sequentially from the terminal VCC to the first transistor 401, the primary coil 321, the fourth transistor 404, and the terminal GND for supplying the electric energy to the motor module 30. In the second driving mode, the control unit 410 turns on the second transistor 402 and the third transistor 403 by controlling the second control signal C2 and the third control signal C3. At this moment the current flows sequentially from the terminal VCC to the third transistor 403, the primary coil 321, the second transistor 402, and the terminal GND for supplying the electric energy to the motor module 30. By operating alternatively between the first driving mode and the second driving mode, the motor module 30 can be rotated normally as a result.

Figure 7:
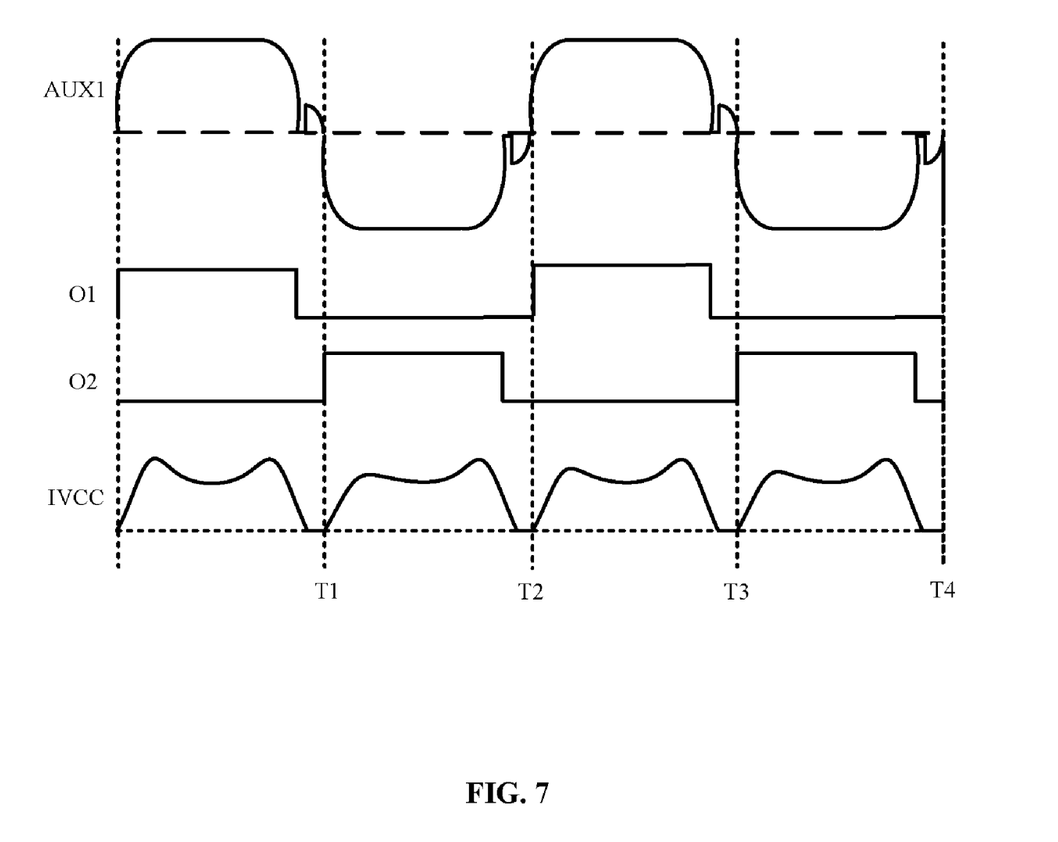
FIG. 7 is a timing chart according to one embodiment of the present invention.

FIG. 7 is a timing chart according to one embodiment of the present invention. Please refer to FIG. 6 and FIG. 7 simultaneously. More specifically, according to one embodiment of the present invention, the motor system 3 detects the zero point of the voltage of the first auxiliary terminal AUX1, so as to detect the position of the rotor 300 and determine the phase switching time point. When the voltage of the first terminal O1 is changed from a high level H to a low level L, the driving current will decrease gradually. When the driving current decreases to 0, the voltage of the first auxiliary terminal AUX1 will increase from 0 to an intermediate value and then decrease to 0 again. The last zero point of the voltage of the first auxiliary terminal AUX1 may be regarded as a phase switching time point T1. In the same manner, the subsequent phase switching time points T2-T4 can be obtained by the same method. Thus, when the zero point of the driving current is detected by the current detecting unit 420, the first detecting signal Vd1 is changed from the low level L to the high level H, so as to inform the control unit 410 to start to detect the zero point of the voltage of the first auxiliary terminal AUX1. When the zero point of the voltage of the first auxiliary terminal AUX1 is detected by the voltage detecting unit 430, the second detecting signal Vd2 is changed from the low level L to the high level H, so as to inform the control unit 410 that the current time point is the phase switching time point. Moreover, when the motor module 30 is operated under a start state or a normal operation state, it is capable of utilizing the auxiliary coil 322 and the voltage of the first auxiliary terminal AUX1 for determining the phase switching time point.

According to one embodiment of the present invention, the motor system 3 can be applied to a single-phase brushless DC motor. The motor system 3 may comprise the first output pin, the second output pin, the auxiliary pin, the stator 310, the rotor 300, the primary coil 321, and the auxiliary coil 322. Both the primary coil 321 and the auxiliary coil 322 surround the stator 310. The primary coil 321 is coupled to the first output pin and the second output pin. The auxiliary coil 322 is coupled to the auxiliary pin. The auxiliary coil 322 is configured to determine a phase switching time point. The motor system 3 determines the phase switching time point based on the voltage of the auxiliary pin. More specifically, the motor system 3 detects the zero point of the voltage of the auxiliary pin, so as to detect the position of the rotor 300 and determine the phase switching time point. When the single-phase brushless DC motor is operated under the start state, the motor system 3 may utilize the auxiliary coil 322 for determining the phase switching time point. Also, when the single-phase brushless DC motor is operated under the normal operation state, the motor system 3 may utilize the auxiliary coil 322 for determining the phase switching time point. Besides, the motor system 3 determines the phase switching time point by installing the auxiliary coil 322, such that the Hall sensing element can be replaced and the volume and the cost of the motor system 3 can be reduced.

While the present invention has been described by the preferred embodiment, it is to be understood that the invention is not limited to the disclosed embodiment. On the contrary, it is intended to cover various modifications. Therefore, the scope of the appended claims should be accorded the broadest interpretation so as to encompass all such modifications.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A motor system comprising:
    a first output pin;
    a second output pin;
    an auxiliary pin;
    a primary coil, coupled to the first output pin and the second output pin;
    an auxiliary coil, coupled to the auxiliary pin; and
    a stator, wherein both the primary coil and the auxiliary coil surround the stator, and the motor system determines a phase switching time point based on a zero point of the voltage of the auxiliary pin.

2. The motor system of claim 1, wherein the motor system determines the phase switching time point by detecting the zero point of the voltage of the auxiliary pin.

3. The motor system of claim 1, wherein the motor system further comprises a rotor, and the motor system detects a position of the rotor by detecting the zero point of the voltage of the auxiliary pin.

4. The motor system of claim 1, wherein the primary coil has a first turn number N1, the auxiliary coil has a second turn number N2, and N1/N2 is greater than 1 or equal to 1.

5. The motor system of claim 1, wherein the motor system is applied to a single-phase brushless DC motor.

6. The motor system of claim 1, wherein the auxiliary coil is coupled to the first output pin or the second output pin.

7. The motor system of claim 1, wherein the auxiliary coil is coupled to a reference voltage.

8. A motor system comprising:
    a first terminal;
    a second terminal;
    a first auxiliary terminal;
    a rotor;
    a primary coil, coupled to the first terminal and the second terminal;
    an auxiliary coil, coupled to the first auxiliary terminal;
    a stator, wherein both the primary coil and the auxiliary coil surround the stator;
    a switch circuit, configured to supply a driving current to the primary coil; and
    a control unit, configured to generate a plurality of control signals to control the switch circuit, wherein the motor system determines a phase switching time point based on a zero point of the voltage of the first auxiliary terminal.

9. The motor system of claim 8, wherein the motor system determines the phase switching time point by detecting the zero point of the voltage of the first auxiliary terminal.

10. The motor system of claim 8, wherein the motor system determines the phase switching time point by detecting a zero point of the driving current.

11. The motor system of claim 8, wherein the motor system determines the phase switching time point by detecting the zero point of the voltage of the first auxiliary terminal and a zero point of the driving current.

12. The motor system of claim 8, wherein the motor system detects a position of the rotor by detecting the zero point of the voltage of the first auxiliary terminal.

13. The motor system of claim 8, wherein the primary coil has a first turn number N1, the auxiliary coil has a second turn number N2, and N1/N2 is greater than 1 or equal to 1.

14. The motor system of claim 8, wherein the motor system further comprises:
    a current detecting unit, configured to detect a zero point of the driving current; and
    a voltage detecting unit, configured to detect the zero point of the voltage of the first auxiliary terminal.

15. The motor system of claim 8, wherein the motor system is applied to a single-phase brushless DC motor.

16. The motor system of claim 8, wherein the auxiliary coil is coupled to the first terminal or the second terminal.

17. The motor system of claim 8, wherein the auxiliary coil is coupled to a reference voltage.

* * * * *